US012683998B2

(12) United States Patent
Feist et al.

(10) Patent No.: US 12,683,998 B2
(45) Date of Patent: Jul. 14, 2026

(54) ATTESTATION OF A CLOUD-BASED EXECUTION ENVIRONMENT FOR PROJECT PLANNING

(71) Applicant: Siemens Aktiengesellschaft, Munich (DE)

(72) Inventors: Christian Peter Feist, Munich (DE); Rainer Falk, Erding (DE); Stefan Becker, Adelsdorf (DE); Klaus-Peter Hofmann, Aurachtal-Münchaurach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 253 days.

(21) Appl. No.: 18/347,385

(22) Filed: Jul. 5, 2023

(65) Prior Publication Data

US 2024/0022591 A1     Jan. 18, 2024

(30) Foreign Application Priority Data

Jul. 12, 2022     (EP) ..................................... 22184350

(51) Int. Cl.
*H04L 9/40*          (2022.01)
*G06Q 10/0631*       (2023.01)
(52) U.S. Cl.
CPC ...  *H04L 63/1433* (2013.01); *G06Q 10/06313* (2013.01)
(58) Field of Classification Search
CPC .................................................. H04L 63/1433
See application file for complete search history.

(56) References Cited

U.S. PATENT DOCUMENTS

| | | | | |
|---|---|---|---|---|
| 12,294,614 | B2* | 5/2025 | Voit ......................... | H04L 63/20 |
| 2013/0030858 | A1* | 1/2013 | Gupta ................ | G06Q 10/0631 |
| | | | | 705/7.23 |
| 2016/0224908 | A1* | 8/2016 | Jagannathan ........ | G06Q 10/063 |
| 2017/0063920 | A1* | 3/2017 | Thomas ................... | H04L 9/32 |
| 2018/0004953 | A1* | 1/2018 | Smith, II .............. | H04L 9/3268 |
| 2018/0373881 | A1 | 12/2018 | Thom ...................... | G06F 21/60 |
| 2019/0066016 | A1* | 2/2019 | Ghosh ................ | G06Q 10/0633 |
| 2022/0198064 | A1 | 6/2022 | Hunt ....................... | G06F 21/62 |
| 2023/0161867 | A1* | 5/2023 | Feist ...................... | G06F 21/32 |
| | | | | 726/26 |

FOREIGN PATENT DOCUMENTS

EP          3 907 637          11/2021  ............. G06F 21/53

* cited by examiner

*Primary Examiner* — William S Powers
(74) *Attorney, Agent, or Firm* — Slayden Grubert Beard PLLC

(57) ABSTRACT

Various embodiments of the teachings herein include an attestation component configured to attest a cloud-based execution environment. The cloud-based execution environment comprises at least one application instance and a project plan assigned to the at least one application instance. The attestation component may include: a determination component configured to determine at least one piece of trustworthiness information indicating a trustworthiness of the cloud-based execution environment and of the at least one application instance; and a linking component configured to establish a link between the trustworthiness information and the project plan.

13 Claims, 2 Drawing Sheets

FIG 2

| | |
|---|---|
| | ~S1 |

| | |
|---|---|
| | ~S2 |

| | |
|---|---|
| | ~S3 |

ATTESTATION OF A CLOUD-BASED EXECUTION ENVIRONMENT FOR PROJECT PLANNING

CROSS-REFERENCE TO RELATED APPLICATIONS

This application claims priority to EP Application No. 22184350.1 filed Jul. 12, 2022, the contents of which are hereby incorporated by reference in their entirety.

TECHNICAL FIELD

The present disclosure relates to project planning. Various embodiments include attestation components configured to attest a cloud-based execution environment, wherein the cloud-based execution environment comprises at least one application instance and a project plan.

BACKGROUND

In the automation industry, automation functions in particular such as machine control or diagnostic functions are increasingly being implemented using cloud technologies and cloud infrastructures (e.g. SoftPLC). Furthermore, the corresponding project planning systems (engineering systems, ES) are also increasingly being offered via cloud infrastructures. Examples of this are the provision of a TIA Portal instance in a cloud environment.

The project planning of an automation component, in particular such as a controller (PLC), an HMI panel, an IO module, is thus carried out via an ES application instance operated in the cloud, which is made available to the user (project developer) for use. In order to save costs for the provision of hardware and/or servers and infrastructure by the cloud provider, the ES application instances of different customers can be run on the same server hardware and runtime environment (in particular the same virtual machine with Linux OS or the same platform of a platform-as-a-service cloud offering). Setting up and using separate cloud infrastructure tenants would be manageable for just a few large customers, but especially if such solutions are to be offered to a large number of customers, such as machine builders, such an approach would not scale.

One problem with such an architecture, which involves using a single-tenancy cloud infrastructure to deliver an engineering solution to multiple tenants (multi-tenant at the service/application level), is that the customers' project planning software and project planning data reside or run on the same system and are thus protected or isolated from each other only by operating system means.

An attacker with legitimate or compromised access to an ES application instance could access the ES application instance and/or project planning data of other clients (customers) by exploiting one or more vulnerabilities in the system, in particular a vulnerability in a container runtime environment. This can lead to a loss of know-how as well as to a violation of the integrity of project planning data. In particular, the violation of integrity can cause an automation system not to perform its expected function and, in the worst case, can cause significant damage.

A well-known approach to increase the trustworthiness of a cloud-based project planning is to provide client-specific execution instances or client-specific servers. However, these are associated with higher costs for the provision of hardware and infrastructure by the cloud provider, as well as operation of the instances. It is known as Measured Boot (often also "Trusted Boot"). Measured Boot typically takes place using a Trusted Platform Module (TPM). Here, starting from a root-of-trust, each boot component forms a cryptographic checksum of the next boot component. The checksums are then stored in special registers, so-called platform configuration registers (PCRs), of the TPM. The PCRs thus contain references to the state of each loaded software component that has been checked. It is then possible to trace whether and which component(s) (e.g. a specific program binary file of an engineering system) were unchanged during loading.

In the context of Measured Boot, the so-called "remote attestation" is known, in which the list of PCR values can be signed by an unextractable private key stored in the TPM. The signature and the list can then be passed on to another instance for verification.

Intel SGX is a set of CPU instructions that enable applications to create enclaves: protected areas in the application's address space designed to ensure confidentiality and integrity in the presence of a privileged attacker. The code in the enclave is activated here using special instructions.

The CPU automatically encrypts all data in the enclave that leave the processor (i.e. everything that is swapped out to RAM), thus ensuring the security of the data used. In addition, only the enclave itself has access to its memory, which makes it possible to prevent tampering and reading by privileged attackers.

The encryption of the main memory is known in principle. Known memory encryption technologies are, e.g., from AMD Secure Memory Encryption (SME), Transparent Secure Memory Encryption (TSME), Secure Encrypted Virtualization (SEV), Secure Encrypted Virtualization-Encrypted State (SEV-ES), Secure Encrypted Virtualization-Secure Nested paging. Intel's Intel Total Memory Encryption and Multi-Key Total Memory Encryption are also known here.

AMD SEV and Intel MKTME in particular make it possible to assign randomly selected, different keys to different virtual machines or containers, which are used for memory encryption of the data of the virtual machines. This makes it possible to cryptographically isolate a virtual machine from a compromised host and from other virtual machines or containers.

Intel SGX as well as AMD SEV and Intel MKTME have an attestation functionality. Here, the CPU uses a secret key to issue signed information about the memory contents of a loaded software/container/virtual machine. This can be checked by a user to verify that the software was loaded as expected—and not manipulated—by the runtime environment.

SUMMARY

The teachings of the present disclosure may be used to increase the security of cloud infrastructures for project design systems. As an example, some embodiments include an attestation component (ES-MC) configured to attest a cloud-based execution environment (ES-EV), wherein the cloud-based execution environment (ES-EV) comprises at least one application instance (ES-AI) and a project plan (P) assigned to the at least one application instance (ES-AI), the attestation component (ES-MC) having: a determination component configured to determine at least one piece of trustworthiness information (PTI) indicating a trustworthiness of the cloud-based execution environment (ES-EV) and of the at least one application instance (ES-AI), and a linking component, configured to establish a link between the trustworthiness information (PTI) and the project plan (P).

In some embodiments, the link is configured as: a reference and/or a cryptographic hash value and/or a Uniform Resource Identifier for the project plan (P).

In some embodiments, an execution of the project plan (P) requires a result of a check of the at least one piece of trustworthiness information (PTI).

In some embodiments, the attestation component (ES-MC), additionally having a checking unit configured to perform a check of the at least one piece of trustworthiness information (PTI) and to produce a result of the check.

In some embodiments, the at least one piece of trustworthiness information (PTI) comprises: a hash value of a kernel and/or a hash value of a binary and/or a hash value of a configuration file of a server of the cloud-based execution environment (ES-EV) and/or of the at least one application instance (ES-AI).

In some embodiments, the at least one piece of trustworthiness information (PTI) comprises information relating to: a state of the cloud-based execution environment (ES-EV) and/or of the at least one application instance (ES-AI) and/or an environmental condition of the cloud-based execution environment (ES-EV) and/or of the at least one application instance (ES-AI) and/or an event in relation to the cloud-based execution environment (ES-EV) and/or the at least one application instance (ES-AI).

In some embodiments, the at least one piece of trustworthiness information (PTI) has a cryptographic signature.

In some embodiments, the at least one piece of trustworthiness information (PTI) comprises client information, wherein the client information relates to a creator of the project plan (P).

In some embodiments, the attestation component (ES-MC) as claimed in one of the preceding claims, additionally having a provisioning component, configured to provide the trustworthiness information (PTI) to the project plan (P).

In some embodiments, the project plan (P) is configured as: a program for a memory-programmable logic controller and/or a program for a human-machine interface device and/or a program for an input/output module.

In some embodiments, the project plan (P) is configured to be used by: an automation component (AC) and/or a manufacturing facility, and/or a production system and/or an automation system (AA).

In some embodiments, the attestation component (ES-MC) is formed within the cloud-based execution environment (ES-EV) and/or formed isolated from the at least one application instance (ES-AI).

As another example, some embodiments include a method for attesting a cloud-based execution environment (ES-EV), wherein the cloud-based execution environment (ES-EV) comprises at least one application instance (ES-AI) and a project plan (P) assigned to the at least one application instance (ES-AI), the method including: determining (S1) at least one piece of trustworthiness information (PTI) indicating a trustworthiness of the cloud-based execution environment (ES-EV) and of the at least one application instance (ES-AI), establishing a link (S2) between the trustworthiness information (PTI) and the project plan (P) and outputting (S3) the trustworthiness information (PTI), which results in attestation of the cloud-based execution environment (ES-EV).

BRIEF DESCRIPTION OF THE DRAWINGS

Various features and advantages of the teachings herein become clear from the following explanations of a plurality of exemplary embodiments on the basis of the schematic drawings. In the figures:

FIG. 2 shows a flow chart of an example method incorporating teachings of the present disclosure.

DETAILED DESCRIPTION

Figure 1:
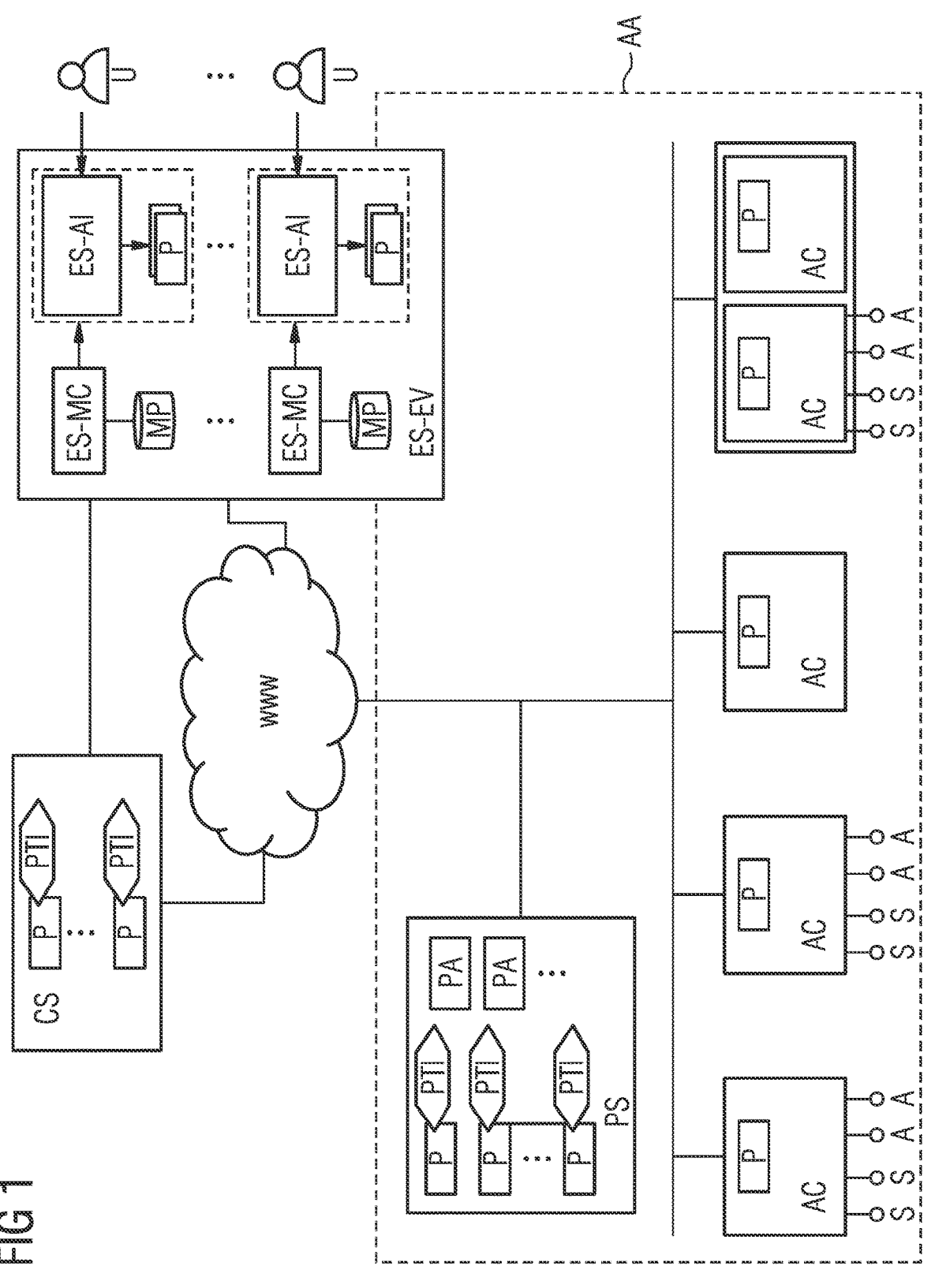
FIG. 1 shows a schematic representation of an example device incorporating teachings of the present disclosure with interacting components.

The present disclosure relates to an attestation component configured to attest a cloud-based execution environment, wherein the cloud-based execution environment comprises at least one application instance and a project plan associated with the at least one application instance, the attestation component having: a determination component configured to determine at least one piece of trustworthiness information indicating a trustworthiness of the cloud-based execution environment and of the at least one application instance; and a linking component, configured to establish a link between the trustworthiness information and the plan.

The determination component is thus to be understood as a trusted component. The determination component determines the trustworthiness information by retrieving or creating it. The trustworthiness information is in particular denotable as integrity information. The trustworthiness information relates here both to the cloud-based execution environment, in particular an execution environment of a cloud-based project planning solution (=project planning tool which allows a project plan to be created), and to the application instance(s) of the project planning solution itself. The project plan can also be referred to as a cloud-based project plan.

Thus, the trustworthiness information particularly comprises integrity information about the cloud-based execution environment and integrity information about the at least one application instance. Trusted means, in the sense of the disclosure, that a correctness of data of the cloud-based execution environment and of the at least one application instance as well as a correct functioning of the cloud-based execution environment and of the at least one application instance is assumed. This means that no compromise of the cloud-based execution environment and/or of the at least one application instance is assumed to have occurred or to be pending. Trusted further means that the execution environment, application instance(s), etc. are in a known state and/or are in a state that is not considered to have been tampered with.

The teachings of the present disclosure apply to the case that a cloud-based project planning tool is used to create the project plan. These teachings include a solution to reliably ensure that the project plan created in the cloud-based execution environment with at least one application instance is trusted. The project plan is usable by one or more automation components.

Some embodiments include a system and/or a method to link a project plan with trustworthiness information within the project planing workflow. The trustworthiness information can be checked by the user before the project plan is applied to an automation component. After the trustworthiness information has been created by means of the trusted component, it is made available in particular via a dedicated, secured channel. A receiving node of the project plan checks the trustworthiness information and uses or activates the project plan depending on a check result.

The teachings herein may be used to increase the trustworthiness of cloud-based project planning. In particular, customers of a multi-client offering thus benefit from increased security, as does the operator themself by saving hardware, infrastructure and operating costs. Overall, the trustworthiness of cloud-based project planning is also increased. This also applies to single-tenant machines.

In principle, the teachings can also be used in combination with client-specific execution instances or servers to provide an offering with increased security here as well. In some embodiments, the link is configured as: a reference, a cryptographic hash value, and/or a Uniform Resource Identifier (URI) for the project plan.

The link component is designed to establish a link, also referred to as an assignment, between the trustworthiness information and the project plan, which can be transferred to an automation system. For this purpose, the assignment or the linking of the trustworthiness information and the project planning takes place, in particular by the trustworthiness information comprising a reference, in particular a cryptographic hash value or a URI, to the project planning information. The reference of the trustworthiness information thus indicates the corresponding project plan which is considered to be trustworthy. In particular, the trustworthiness information, which is itself a hash value of certain system properties, is concatenated with a hash of the project planning information and a common hash value is formed therefrom. This last, common hash value forms in particular the link component.

In some embodiments, an execution of the project plan requires a result of a check of the at least one trustworthiness information. A receiving node of the project plan particularly checks the trustworthiness information and uses or activates the project plan depending on a check result. The project plan may be configured such that this check result is necessary for the use of the project plan.

A receiver of a project plan can check this information. The trustworthiness information is checked in particular before the project plan is used, in particular before it is loaded onto an automation component or activated by an automation component. In particular, a user can verify that the project plan was actually created on an intended application instance and that a permissible version of the project planning tool software was executed there.

In some embodiments, the check of the trustworthiness information can be performed in an automated fashion, e.g. by the programming agent (PA) in an automation system. If the check fails, the use of the corresponding project plan is rejected. In addition, appropriate reactions can be executed, e.g. generating a log entry, sending a mail to an admin or operator, triggering a system warning.

If the check is successful, it can be assumed with higher certainty that the project plan was created with a trustworthy, cloud-based project planning solution. If a project plan was created in a different cloud environment or with a different version, this can thus be detected.

In some embodiments, the attestation component additionally comprises a checking unit configured to perform a check of the at least one piece of trustworthiness information and to produce a result of the check. The check of the trustworthiness information can already be performed by the attestation component and the check result can be transmitted with the trustworthiness information. In one of these variants, the check is thus performed by a cloud-based monitoring server and only the result is transmitted. In this way, the check can be offered directly to a customer as a service.

In some embodiments, the at least one piece of trustworthiness information comprises: a hash value of a kernel, a hash value of a binary, and/or a hash value of a configuration file of a server of the cloud-based execution environment and/or of the at least one application instance. In this context, the trustworthiness information and its components relate in each case to that cloud-based execution environment and/or the at least one application instance for which the trustworthiness information was determined.

The hash values, in particular cryptographic hash values, concern selected parts of the cloud-based execution environment, such as in particular a bootloader, operating system kernels, user-space program binaries, container images, configuration files of programs. Cryptographic hash values of the files belonging to an application instance concern in particular program binaries, such as container images, configuration files, deployment information, such as Kubernetes PodSpec, Docker Compose YAML. The logging of the cryptographic hash values can be performed in particular with the help of operating system mechanisms, such as Linux IMA, as well as hardware mechanisms, such as AMD SEV attestation/Intel MKTME attestation, TPM-based attestation, SGX attestation.

In some embodiments, the at least one piece of trustworthiness information comprises a piece of information relating to a state of the cloud-based execution environment and/or the at least one application instance, an environmental condition of the cloud-based execution environment and/or the at least one application instance, and/or an event in relation to the cloud-based execution environment and/or the at least one application instance.

Some examples include, but are not limited to: Log entries for integrity-relevant events, in particular such as failed host logins, establishment of unauthorized and/or unexpected connections; Information on the configuration of hardware and software of the cloud-based execution environment, in particular whether certain HW/SW security features such as Intel CET, SELinux or AppArmor, Secure-Boot are activated; Events that indicate malicious behavior of the at least one application instance, in particular the execution of non-permitted system calls or unexpected sequences of system calls; Data about the project plan itself, such as in particular an audit log of the at least one application instance (executed actions, time, user), can be integrated into the Project Trustworthiness Information (PTI). For example, the trustworthiness information can also be used to reliably track changes in case of compromised access to the at least one application instance (in particular if the access data for the at least one application instance have been compromised); Version states of the software components used on the cloud-based execution environment and/or in the at least one application instance. These can then be used for comparison with databases containing information regarding known vulnerabilities. In particular, this can be used to determine whether a project plan was created at a time when packages with known vulnerabilities were present on the system; and/or Client identifier of those users who have created or modified the project plan.

In some embodiments, the at least one piece of trustworthiness information has a cryptographic signature. The trustworthiness information is protected, in particular by a cryptographic signature. The key used to generate the signature should also only be accessible here by the associated attestation component and can be protected separately, in particular by means of hardware mechanisms such as Intel SGX, ARM TrustZone, or via software-based isolation, such as SELinux or AppArmor in particular. The trustworthiness information can also be provided as Attestation, as Verifiable Credential or Verifiable Presentation.

In some embodiments, the attestation component can also be implemented so that the system receiving the trustworthiness information can verify that it was determined correctly (performing the expected steps), as known under "Verifiable Computing".

In some embodiments, the at least one piece of trustworthiness information comprises client information, wherein the client information relates to a creator of the project plan. It is thus proposed that the trustworthiness information comprises information about a client, in particular a tenant, or individual, different users of these tenants, in particular in the form of an ID or a certificate, to which the users accessing the cloud-based project planning solution are assigned. There may be a single client here, but there may also be several clients in general. This makes it possible to detect when a project plan is loaded that was created by a different client than expected. This can be distinguished even if different clients use the same cloud-based project planning solution to create project plans.

In some embodiments, the attestation component additionally comprises a provisioning component, configured to provide the trustworthiness information to the project plan. The trustworthiness information is provided here in particular via a dedicated, secure channel. The trustworthiness information is provided in particular to an interactive user of an application instance, or to a system or an automation component within the automation system (preferably in cryptographically protected form, in particular an Attestation or a Verifiable Credential or Verifiable Presentation, as described above).

Since a transmission of a possibly tampered-with project plan to a project planning server in the automation system is performed by a possibly compromised application instance itself, it is thus proposed to transmit the trustworthiness information via a second channel to the project planning server in the automation system. The trustworthiness information is managed by the attestation component in its protected execution environment and can be transmitted either directly to the client's or customer's project planning server or via the cloud-based execution environment, in particular a cloud-based monitoring server.

The cloud-based monitoring server is optional, but offers several potential features: First, it is not directly accessible by a compromised attestation component or cloud-based execution environment. Furthermore, the result of a check of the trustworthiness information can be made directly available to a user, especially via a web-based interface provided through the cloud-based monitoring server. A disadvantage is the somewhat higher cost for the operator of the cloud-based project planning solution, since an additional server has to be rented and operated. In principle, however, this could also be charged as an additional service for a customer who wants improved assurance of the trustworthiness of the project planning environment.

In some embodiments, the project plan is configured as: a program for a memory-programmable logic controller (PLC), also referred to as a programmable logic controller, a program for a Human Machine Interface (HMI) device, and/or a program for an input/output (IO) module.

In some embodiments, the project plan is configured to be used by: an automation component, a manufacturing facility, a production system, and/or an automation system.

In some embodiments, the attestation component is formed within the cloud-based execution environment and/ or isolated from the at least one application instance. In some embodiments, the attestation component is separately isolated from the application \instances. In particular, these can be implemented as dedicated processes in the cloud-based execution environment, implemented via operating system means such as SELinux, AppArmor, Smack, by integration into the operating system or a hypervisor, execution in a Trusted Execution Environment (SGX Enclave, ARM TrustZone Secure World, etc.) and thus protected against a compromised application instance.

In some embodiments, the attestation component can also be implemented on additional hardware modules or components that have access to the cloud-based execution environment, in particular in the form of DMA accesses to the main memory. Examples include implementation as a PCIe plug-in card, or via special server management functions (e.g. Redfish). The configuration is done via a monitoring policy (MP), which defines which parts of the cloud-based execution environment and the application instance are to be taken into account by the attestation component when computing the trustworthiness information. It is also conceivable to configure the time of the computation, in particular with each project download, when starting the cloud-based execution environment and/or an application instance, cyclically at regular intervals, in particular every 10 minutes, with each write operation to a project planning file, etc.

Some embodiments include a method for attesting a cloud-based execution environment, wherein the cloud-based execution environment comprises at least one application instance and a project plan assigned to the at least one application instance, the method including: determining at least one piece of trustworthiness information indicating a trustworthiness of the cloud-based execution environment and the at least one application instance, establishing a link between the trustworthiness information and the project plan, and outputting the piece of trustworthiness information, which results in attestation of the cloud-based execution environment.

FIG. 1 shows an example embodiment of a cloud-based execution environment ES-EV incorporating teachings of the present disclosure, also denotable as an Engineering System Execution Environment ES-EV, of a cloud-based project planning system. In the cloud-based execution environment ES-EV, one application instance ES-AI, also referred to as an Engineering System Application Instance ES-AI, e.g. TIA Portal instance, runs per user U or client U or customer U of the project planning solution and is used by the user U or client U to create one or more project plans P, e.g. a program for a PLC, an HMI device, an IO module.

These project plans P are loaded by the user U from the Cloud server CS via an Internet connection www to a project planning server PS in the automation system AA. From there, they can be loaded onto the respective automation components AC, in particular designed as PLC, HMI or vPLC, in the automation system AA. The automation components AC have sensors S and actuators A. Receipt and further transmission can be carried out here by means of a programming agent (PA) running on the project planning server (PS).

In some embodiments, the trustworthy attestation components ES-MCs, also referred to as Engineering System Monitoring Component ES-MCs, are provided and configured by the provider of the cloud-based project planning solution. These have access to the cloud-based execution environment ES-EV and the attestation components ES-AIs in order to compute corresponding trustworthiness information PTI, also referred to as integrity information PTI or project trustworthiness information PTI. The integrity information PTI also includes a link to a project plan.

The configuration of the trusted Engineering System Monitoring Components ES-MCs is done via a Monitoring Policy MP, which defines which parts of the cloud-based execution environment ES-EV and of the application instance ES-AIs should be taken into account by the attestation components ES-MCs when computing the trustworthiness information PTI.

In some embodiments, the attestation components ES-MCs are separately isolated from the application instances ES-AIs. These can be implemented, for example, as dedicated processes on the ES-EV, which are implemented via operating system means such as SELinux, AppArmor, Smack, by integration into the operating system or a hypervisor, execution in a Trusted Execution Environment (SGX Enclave, ARM TrustZone Secure World, etc.) and are thus protected against a compromised application instance ES-AI.

In some embodiments, the ES-MCs can also be realized on additional hardware modules/components that have access to the cloud-based execution environment ES-EV (in particular in the form of DMA accesses to the main memory). Embodiments are the realization as PCIe plug-in card, or in particular via special server management functions (e.g. Redfish). The configuration is done via a monitoring policy MP, which defines which parts of the cloud-based execution environment ES-EV and the application instance ES-AIs should be taken into account by the attestation components ES-MCs when computing the trustworthiness information PTI. It is also conceivable to configure the time of the computation, e.g., with each project download, at the start of the cloud-based execution environment ES-EV and/or an application instance ES-AI, cyclically at regular intervals (e.g., every 10 minutes), with each write operation to a projecting file P, etc.

Figure 2:
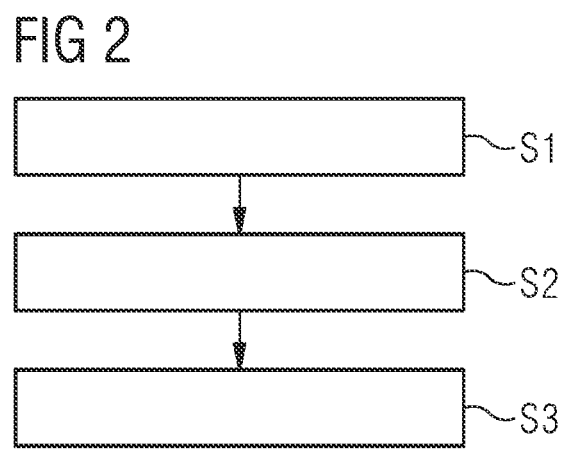

FIG. 2 shows a flowchart of an example method incorporating teachings of the present disclosure for attesting a cloud-based execution environment, wherein the cloud-based execution environment comprises at least one application instance and a project plan assigned to the at least one application instance, the method including: step S1: determining at least one piece of trustworthiness information indicating a trustworthiness of the cloud-based execution environment and of the at least one application instance, step S2: establishing a link between the trustworthiness information and the project plan, and step S3: outputting the trustworthiness information, which results in an attestation of the cloud-based execution environment.

Although the teachings herein have been illustrated and described more specifically in detail by means of the exemplary embodiments, the scope of the disclosure is not restricted by the disclosed examples and other variations may be derived therefrom by a person skilled in the art without departing from the scope of protection of the disclosure.

The invention claimed is:

1. An attestation component configured to attest a cloud-based execution environment, wherein the cloud-based execution environment comprises at least one application instance and a project plan assigned to the at least one application instance, the attestation component comprising:

a determination component configured to determine at least one piece of trustworthiness information indicating a first trustworthiness of the cloud-based execution environment and a second trustworthiness of the at least one application instance;

wherein the second trustworthiness reflects memory contents of the at least one application instance and represents a determination that associated software was loaded as expected and not manipulated; and a linking component configured to establish a link between the trustworthiness information and the project plan;

wherein the at least one piece of trustworthiness information comprises: a hash value of a kernel or a hash value of a binary of a server of the cloud-based execution environment and/or of the at least one application instance.

2. The attestation component as claimed in claim 1, wherein the link is configured as: a reference, a cryptographic hash value, and/or a Uniform Resource Identifier for the project plan.

3. The attestation component as claimed in claim 1, wherein an execution of the project plan requires a result of a check of the at least one piece of trustworthiness information.

4. The attestation component as claimed in claim 1, further comprising a checking unit configured to perform a check of the at least one piece of trustworthiness information and to produce a result of the check.

5. The attestation component as claimed in claim 1, wherein the at least one piece of trustworthiness information comprises: a hash value of a configuration file of a server of the cloud-based execution environment and/or of the at least one application instance.

6. The attestation component as claimed in claim 1, wherein the at least one piece of trustworthiness information comprises information relating to: a state of the cloud-based execution environment and/or of the at least one application instance, an environmental condition of the cloud-based execution environment and/or of the at least one application instance, and/or an event in relation to the cloud-based execution environment and/or the at least one application instance.

7. The attestation component as claimed in claim 1, wherein the at least one piece of trustworthiness information has a cryptographic signature.

8. The attestation component as claimed in claim 1, wherein the at least one piece of trustworthiness information comprises client information, wherein the client information relates to a creator of the project plan.

9. The attestation component as claimed in claim 1, further comprising a provisioning component, configured to provide the trustworthiness information to the project plan.

10. The attestation component as claimed in claim 1, wherein the project plan is configured as: a program for a memory-programmable logic controller, a program for a human-machine interface device, and/or a program for an input/output module.

11. The attestation component as claimed in claim 1, wherein the project plan is configured to be used by: an automation component, a manufacturing facility, a production system, and/or an automation system.

12. The attestation component as claimed in claim 1, formed within the cloud-based execution environment and/or formed isolated from the at least one application instance.

13. A method for attesting a cloud-based execution environment including at least one application instance and a project plan assigned to the at least one application instance, the method comprising:

determining at least one piece of trustworthiness information indicating a first trustworthiness of the cloud-based execution environment and a second trustworthiness of the at least one application instance;

wherein the second trustworthiness reflects memory contents of the at least one application instance and represents a determination that associated software was loaded as expected and not manipulated;

establishing a link between the trustworthiness information and the project plan; and transmitting the trustworthiness information, resulting in attestation of the cloud-based execution environment for the project plan;

wherein the at least one piece of trustworthiness information comprises: a hash value of a kernel or a hash value of a binary of a server of the cloud-based execution environment and/or of the at least one application instance.

* * * * *